US009573521B2

United States Patent
Lee et al.

(10) Patent No.: US 9,573,521 B2
(45) Date of Patent: Feb. 21, 2017

(54) APPARATUS FOR GENERATING VIRTUAL ENGINE SOUND

(71) Applicant: Hyundai Motor Company, Seoul (KR)

(72) Inventors: Kitae Lee, Gyeonggi-Do (KR); Sung Kwang Shin, Gyeonggi-Do (KR); Dong Kon Lee, Gyeonggi-Do (KR); Ji Hoon Jeong, Gyeonggi-Do (KR); Chang Beom Kim, Seoul (KR); Bong Ho Lee, Gyeonggi-Do (KR); Eun Seok Yoo, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 231 days.

(21) Appl. No.: 14/550,918

(22) Filed: Nov. 22, 2014

(65) Prior Publication Data

US 2016/0052448 A1 Feb. 25, 2016

(30) Foreign Application Priority Data

Aug. 25, 2014 (KR) ........................ 10-2014-0110909

(51) Int. Cl.
*B60Q 5/00* (2006.01)
*G10K 1/074* (2006.01)

(52) U.S. Cl.
CPC .............. *B60Q 5/008* (2013.01); *G10K 1/074* (2013.01)

(58) Field of Classification Search
CPC ........... A63H 17/34; B60Q 5/00; B60Q 5/005; B60Q 5/008; B60Q 1/506; G10K 1/07; G10K 1/072; G10K 1/074
USPC ............... 116/35 R, 37, 56, 57, 60, 67 R, 74
See application file for complete search history.

(56) References Cited

U.S. PATENT DOCUMENTS

| 116,241 A | * | 6/1871 | Volger | G10K 1/071 116/171 |
| 990,683 A | * | 4/1911 | Tenney, Jr. | G01P 1/08 116/57 |
| 1,136,410 A | * | 4/1915 | Crossland | G01P 1/08 116/156 |
| 1,905,261 A | * | 4/1933 | Bernstrom | G01P 1/10 116/74 |
| 2,495,698 A | * | 1/1950 | Chilson | G10K 1/074 116/154 |
| 2,843,075 A | * | 7/1958 | Geraghty | B60Q 1/44 116/25 |

(Continued)

FOREIGN PATENT DOCUMENTS

| JP | 3157320 U | * | 2/2010 | B60Q 5/00 |
| JP | 2011020665 A | * | 2/2011 | B60Q 1/32 |

(Continued)

*Primary Examiner* — R. A. Smith
(74) *Attorney, Agent, or Firm* — Mintz Levin Cohn Ferris Glovsky and Popeo, P.C.; Peter F. Corless

(57) ABSTRACT

An apparatus for generating a virtual engine sound is provided. The apparatus includes a rotating bracket member that is disposed within a wheel of a vehicle and includes movement space therein, and elastic bodies, each of which has a first end fixed to a substantial rotation center position of the rotating bracket member. In addition, the apparatus includes weight bodies which are fixed to a second end of the elastic body, and are configured to move within the movement space based on a rotation speed of the wheel of the vehicle, and selectively contact the rotating bracket member.

10 Claims, 4 Drawing Sheets

(56) References Cited

U.S. PATENT DOCUMENTS

| | | | | |
|---|---|---|---|---|
| 2,915,036 | A * | 12/1959 | Bookwalter | G10K 1/07 |
| | | | | 116/35 R |
| 3,039,423 | A * | 6/1962 | Warn | B60R 25/1006 |
| | | | | 116/155 |
| 3,302,954 | A * | 2/1967 | Elwell | A63C 17/26 |
| | | | | 116/56 |
| 3,583,521 | A * | 6/1971 | Anstey | G01V 1/147 |
| | | | | 181/114 |
| 3,786,776 | A * | 1/1974 | Buthe et al. | A01B 61/025 |
| | | | | 116/67 R |
| 4,220,112 | A * | 9/1980 | Neilsen | A63C 17/26 |
| | | | | 116/56 |
| 4,270,764 | A * | 6/1981 | Yamada | A63C 17/26 |
| | | | | 280/1.14 |
| 6,374,767 | B1 * | 4/2002 | Gohl et al. | B60Q 5/00 |
| | | | | 116/152 |
| 6,739,282 | B1 * | 5/2004 | Yuan | G10K 1/071 |
| | | | | 116/148 |
| 6,945,677 | B2 * | 9/2005 | Fu | B62J 3/00 |
| | | | | 340/432 |
| 9,240,175 | B1 * | 1/2016 | Wyche | G10K 1/10 |
| 2012/0067659 | A1 * | 3/2012 | Ogura | B06B 1/16 |
| | | | | 180/291 |

FOREIGN PATENT DOCUMENTS

| | | | | |
|---|---|---|---|---|
| JP | 2011195038 | A * | 10/2011 | B60Q 5/00 |
| JP | 2012066751 | A * | 4/2012 | B60Q 5/00 |
| JP | 2012171512 | A * | 9/2012 | B60B 3/04 |
| JP | 5325728 | B2 | 10/2013 | |

* cited by examiner

APPARATUS FOR GENERATING VIRTUAL ENGINE SOUND

CROSS-REFERENCE TO RELATED APPLICATION

This application claims priority to and the benefit of Korean Patent Application No. 10-2014-0110909 filed on Aug. 25, 2014, the entire contents of which are incorporated herein by reference.

BACKGROUND

Field of the Invention

The present invention relates to an apparatus for generating a virtual engine sound, and more particularly, to an apparatus that generates a virtual engine sound when a vehicle travels at a substantially low speed.

Description of the Related Art

In general, an environmentally-friendly vehicle (e.g., an electric vehicle or the like) may not include an engine or may have periods of time when an engine does not operate. Further, a pedestrian may hear an engine sound of the vehicle, and recognize that the vehicle is traveling in the vicinity of (e.g., near) to the pedestrian.

However, engine sounds that correspond to acceleration and deceleration of the vehicle may not be generated in the environmentally-friendly vehicle. Accordingly, a collision between a pedestrian and the environmentally-friendly vehicle may occur when the vehicle travels at a substantially low speed.

Therefore, to virtually generate an engine sound for the environmentally-friendly vehicle, a speaker may be disposed at a front part of the vehicle. However, the installation of a speaker, an amplifier, and the like may increase cost of the vehicle and decrease fuel efficiency.

Further, the speaker is installed within a front bumper of the vehicle, but an opening part of the bumper is minimally configured within the environmentally-friendly vehicle to improve fuel efficiency and aerodynamic performance, which may cause a decrease in acoustic transfer efficiency of the speaker. In addition, the virtual engine sound varies based on a speed of the vehicle, thus requiring controller, which may cause a further increase in a cost of the vehicle.

The above information disclosed in this section is merely for enhancement of understanding of the background of the invention and therefore it may contain information that does not form the prior art that is already known in this country to a person of ordinary skill in the art.

SUMMARY

The present invention provides an apparatus for generating a virtual engine sound, which may prevent deterioration of fuel efficiency in an environmentally-friendly vehicle, and may have improved acoustic efficiency.

An exemplary embodiment of the present invention provides an apparatus for generating a virtual engine sound, that may include: a rotating bracket member, which may be installed within a vehicle wheel and may include a movement space therein; elastic bodies, each of which may have one end (e.g., a first end) fixed to a substantial rotation center position of the rotating bracket member; and weight bodies, each of which may be fixed to the other end (e.g., a second end) of the elastic body. In addition, the weight bodies may be configured to move within the movement space based on a rotation speed of the wheel of the vehicle and may selectively contact the rotating bracket member.

The rotating bracket member may be installed within the wheel of the vehicle, and may have a first lateral surface that has a substantially round shape and a second lateral surface that has a substantially round shape and faces the first lateral surface. Further, the second lateral surface may be formed within the movement space. The rotating bracket member may have lead-in recesses formed on the second lateral surface. Two or more lead-in recesses may be formed on the second lateral surface. The weight body may be connected to the elastic body, and may be a conductive circular metal ball. A plurality of circular metal balls may be radially installed around a substantial rotation center of the rotating bracket member.

The elastic bodies may be elastic springs configured to support the weight body to dispose the weight body to be spaced apart from the second lateral surface of the rotating bracket member when the wheel of the vehicle is not rotating (e.g., the vehicle is not moving). The elastic springs may have elastic force to cause the weight bodies to contact (e.g., touch) the second lateral surface of the rotating bracket member at a predetermined rotation speed of the wheel of the vehicle or greater.

The apparatus may further include magnetic members which may be disposed on the first lateral surface of the rotating bracket member and may fix the weight body to the second lateral surface. Two or more magnetic members may be installed along a circumference of the first lateral surface of the rotating bracket member.

According to the exemplary embodiment of the present invention, a virtual engine sound may be generated when a vehicle travels at a substantially low speed, and a virtual engine sound may not be generated when a vehicle travels at a substantially high speed by installing the weight bodies. The virtual engine sound may be selectively generated based on a centrifugal force within a wheel of the vehicle. Further, a virtual engine sound may be generated by installing weight bodies within a wheel of a vehicle, which may generate a virtual engine sound thus reducing a cost of the vehicle.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION OF THE EMBODIMENTS

Figure 1:
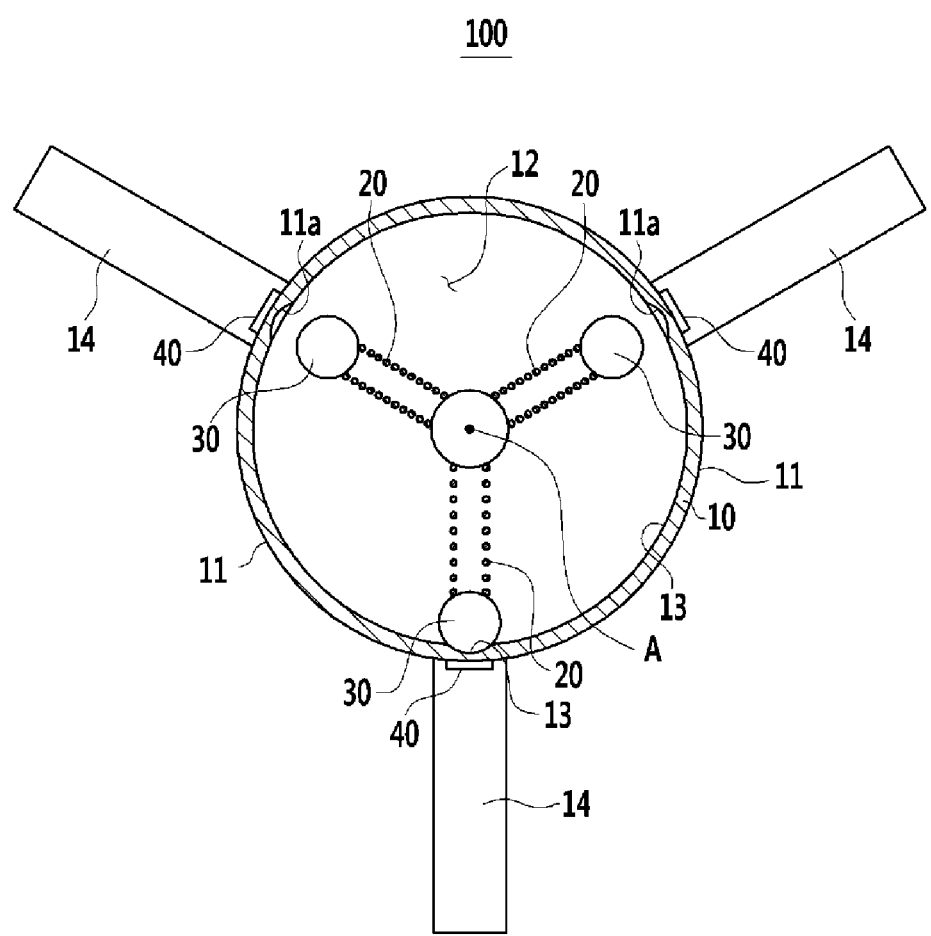
FIG. 1 is an exemplary diagram schematically illustrating an apparatus for generating a virtual engine sound according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, exemplary embodiments of the present invention have been shown and described, simply by way of illustration. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification.

FIG. 1 is an exemplary diagram schematically illustrating an apparatus for generating a virtual engine sound according to an exemplary embodiment of the present invention. As illustrated in FIG. 1, an apparatus 100 for generating a virtual engine sound may include a rotating bracket member 10, which may be disposed within a wheel of a vehicle and may include a moving space 12 therein, elastic bodies 20, and weight bodies 30. Each of the substantially elastic bodies may have a first end fixed to a substantial rotation center position A of the rotating bracket member 10. In addition, each of is the weight bodies may be fixed to a second end of the elastic body 20 and may be configured to move within the movement space 12 based on a rotation speed of the wheel of the vehicle.

The apparatus 100 may be installed within a vehicle such as an electric vehicle, which does not generate a vehicle engine sound or generates a substantially weak (e.g., quiet) engine sound. A pedestrian may not hear the substantially weak engine sound. Hereinafter, the apparatus 100 for generating a virtual engine sound will be described in more detail.

The rotating bracket member 10 may be disposed within a wheel of the vehicle. More particularly, the rotating bracket member 10 may be fixed to wheel caps 14 of the wheel of the vehicle. The rotating bracket member 10 may be fixed to the wheel of the vehicle by welding, or detachably fixed to the wheel of the vehicle by a separate fastening means (not illustrated) (e.g., clip, adhesive, or the like). The rotating bracket member 10 may include a first lateral surface 11 that may have a substantially round shape and a second lateral surface 13, which may have a substantially round shape, may face the first lateral surface 11, and may be formed within the movement space 12. The elastic bodies 20 may be disposed within the movement space 12 of the rotating bracket member 10.

Each of the elastic bodies 20 may be installed at the substantial rotation center position A of the rotating bracket member 10. In addition, the apparatus 100 may include an elastic spring. Hereinafter, the same reference numeral 20 is assigned to the elastic body and the elastic spring. As described above, a first end of the elastic spring 20 may be fixed to the wheel of the vehicle at a substantial center position of the rotating bracket member 10. In an exemplary embodiment, the first end of the elastic spring 20 may be fixed to the wheel of the vehicle, but the present invention is not limited thereto, and the first end of the elastic spring 20 may be fixed to the wheel of the vehicle by using a separate bracket (not illustrated). A second end of the elastic spring 20 may be connected to one of the weight bodies 30.

The weight bodies 30 may be disposed at the second end of the elastic spring 20. In addition, circular metal balls made of a conductive metal may be used as the weight bodies. The weight bodies 30 may selectively move based on a centrifugal force within the movement space of the rotating bracket member 10 based on the rotation of the wheel of the vehicle.

More particularly, the weight body 30 may not contact the second lateral surface 13 of the rotating bracket member 10 due to an elastic force of the elastic spring 20 when the wheel of a vehicle rotates a predetermined rotation speed or less. In other words, a centrifugal force less than the elastic force of the elastic spring 20 may be applied at the predetermined rotation speed or less of the wheel of the vehicle, to prevent the weight body 30 from contacting the second lateral surface 13.

Further, when the rotation speed of the wheel of the vehicle is greater than (e.g., exceeds) the predetermined rotation speed of the wheel of the vehicle, the centrifugal force may increase to cause the weight body 30 to selectively contact the second lateral surface 13. As described above, when the weight body 30 is in contact with the second lateral surface 13 of the rotating bracket member 10, a sound similar to the engine sound of the vehicle may be generated, which may notify a pedestrian of the vehicle traveling in the vicinity of (e.g., near) the pedestrian.

However, when rotation speed of the wheel of the vehicle is substantially greater than (e.g., substantially exceeds) the predetermined rotation speed of the wheel of the vehicle, the centrifugal force further may increase allowing the weight body 30 to maintain contact with the second lateral surface 13 of the rotating bracket member 10. Accordingly, the weight body 30 may be configured to maintain contact with the second lateral surface 13 of the rotating bracket member 10 while the vehicle travels at a substantially high speed, to prevent the virtual engine sound from being generated.

Three weight bodies 30 may be radially installed around the substantial rotation center position A of the rotating bracket member 10. In particular, the three elastic springs 20 may be radially installed to correspond to the number of weight bodies 30 based on the substantial rotation center position A of the rotating bracket member 10. The number of weight bodies 30 installed may not be limited to three, and more than three or two or less weight bodies 30 may be used.

Lead-in recesses 11a may be disposed on the second lateral surface 13 of the rotating bracket member 10 to create a smoother contact with the weight bodies 30. The number of lead-in recesses 11a (e.g., three) may correspond to the number of weight bodies 30. An external surface of the weight body 30 may contact (e.g., touch) the lead-in recess 11a when the wheel of the vehicle rotates (e.g., the vehicle is moving).

Further, magnetic members 40 may be disposed on the first lateral surface 11 of the rotating bracket member 10 to fix the weight bodies 30. A plurality of magnetic members 40 may be installed along a circumference of the first lateral surface 11 of the rotating bracket member 10. In other words, three or more magnetic members 40 may be installed to correspond to the positions of the lead-in recesses 11a. Accordingly, the weight bodies 30 may be substantially smoothly fixed to the rotating bracket member 10 when the weight body 30 contacts the rotating bracket member 10 and the vehicle travels at a substantially high speed (e.g., a predetermined speed). Further, the engine sound may not be generated when the vehicle travels at a substantially high speed, which may result in silent driving.

Figure 2:
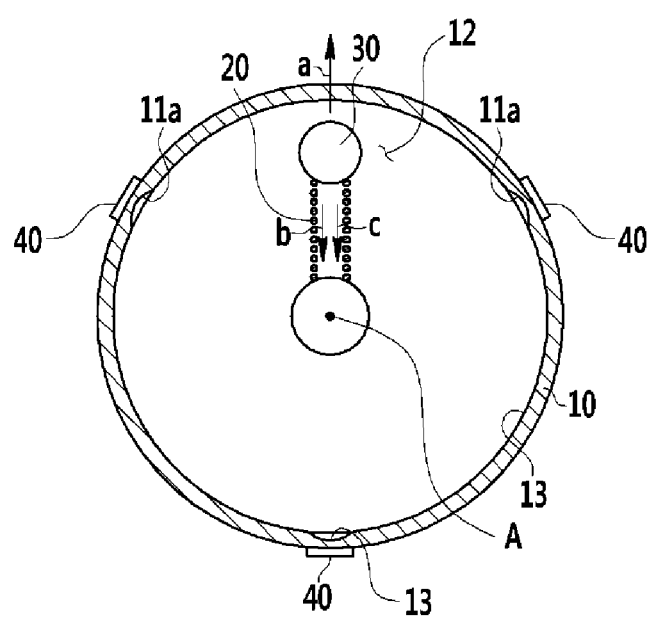
FIG. 2 is an exemplary diagram schematically illustrating when a weight body is spaced apart from a rotating bracket member when a vehicle travels at a substantially low speed according to an exemplary embodiment of the present invention.

An operation of the apparatus for generating a virtual engine sound according an exemplary embodiment will be described in more detail below with reference to the drawings. FIG. 2 is an exemplary diagram illustrating when the weight body does not contact (e.g., is spaced apart) from the rotating bracket member when the vehicle travels at a substantially low speed (e.g., is less than a predetermined speed), and FIG. 3 is an exemplary diagram illustrating when the weight body contacts the rotating bracket member when the vehicle travels at a substantially low speed.

Figure 3:
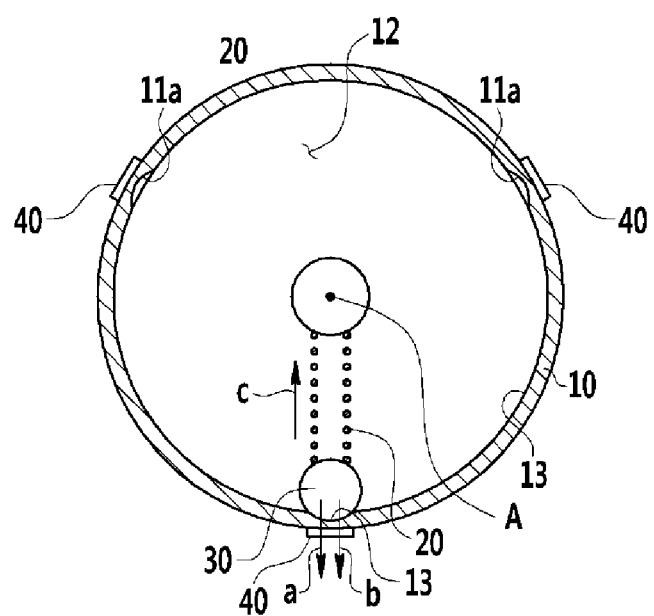
FIG. 3 is an exemplary diagram schematically illustrating when a weight body is in contact with a rotating bracket member when a vehicle travels at a low speed according to an exemplary embodiment of the present invention.

As illustrated in FIG. 3, at a predetermined number of revolutions per minute or less of the wheel of the vehicle, that is, when the vehicle travels at a substantially low speed, the weight body 30, disposed at a lower part among the weight bodies 30, may contact the second lateral surface 13 of the rotating bracket member 10 when a force of the weight bodies 30 is greater than an elastic force of the spring member 20 based on the centrifugal force and the weight of the weight body 30.

In particular, as illustrated in FIG. 2, the weight of the weight bodies 30 may be applied to compress the spring member 20, to cause the weight bodies 30 to be spaced apart from the second lateral surface 13 of the rotating bracket member 10. Accordingly, when the vehicle travels at a substantially low speed, the weight bodies 30 may selectively contact the rotating bracket member 10 to generate the virtual engine sound, to warn a pedestrian of the vehicle nearby.

Figure 4:
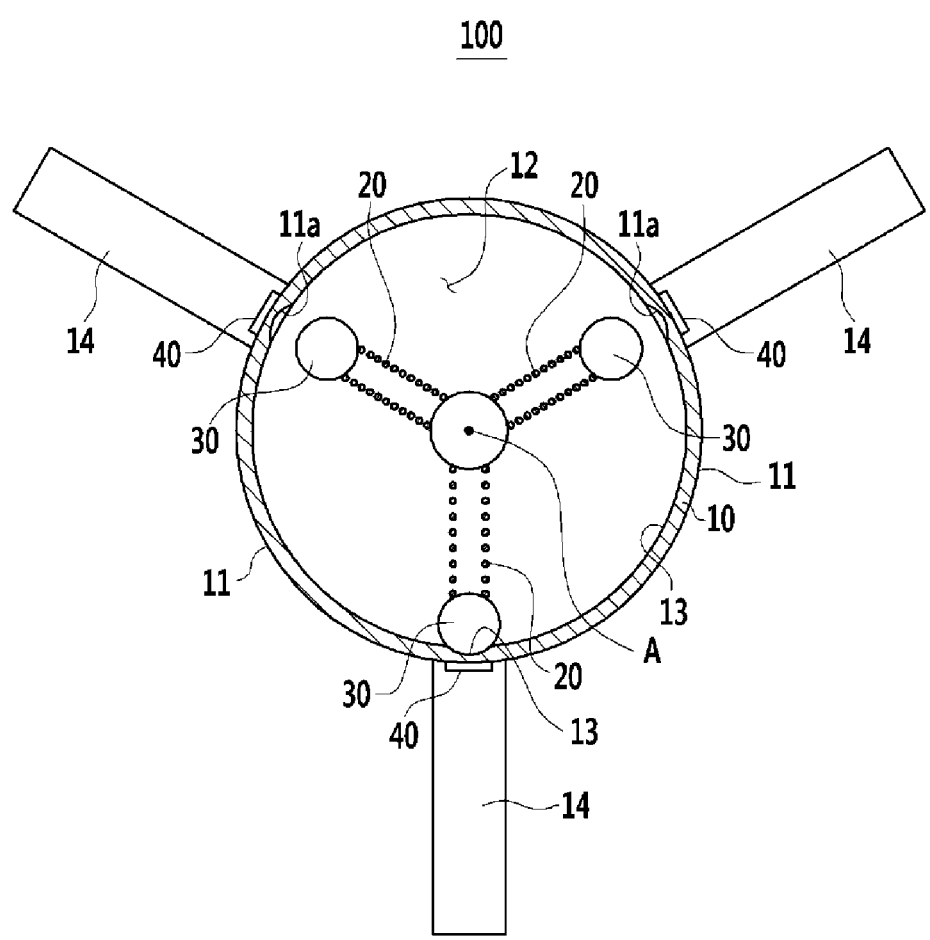
FIG. 4 is an exemplary diagram schematically illustrating when a weight body is in contact with a rotating bracket member when a vehicle travels at a substantially high speed according to an exemplary embodiment of the present invention.

FIG. 4 is an exemplary diagram illustrating when the weight body contacts the rotating bracket member when the vehicle travels at a substantially high speed. As illustrated in FIG. 4, when the vehicle travels at a substantially high speed, the centrifugal force may be further applied, to cause the force of the weight bodies 30 to overcome the elastic force of the spring member 20, and the weight body 30 may be fixed to the rotating bracket member 10. Accordingly, when the vehicle travels at a substantially high speed, the weight bodies 30 may not selectively contact the rotating bracket member 10, which may prevent a sound from being generated.

The present invention has been described with reference to the exemplary embodiment illustrated in the drawings. However, the present invention is not limited thereto, and various modified examples or other exemplary embodiments belonging to the scope equivalent to that of the present invention are available by those skilled in the art.

DESCRIPTION OF SYMBOLS

10 . . . Bracket member
11 . . . First lateral surface
11a . . . Lead-in recess
13 . . . Second lateral surface
20 . . . Elastic body
30 . . . Weight body
40 . . . Magnetic member

What is claimed is:

1. An apparatus for generating a virtual engine sound, comprising:
   a rotating bracket member disposed within a wheel of a vehicle and including a movement space within the rotating bracket member;
   a plurality of elastic bodies, each of which has a first end fixed to a substantial rotation center position of the rotating bracket member; and
   a plurality of weight bodies, each of which is fixed to a second end of the elastic body, and configured to move within the movement space based on a rotation speed of the wheel of the vehicle and selectively contacts the rotating bracket member.

2. The apparatus of claim 1, wherein the rotating bracket member includes:
   a first lateral surface that has a substantially round shape; and
   a second lateral surface that has a substantially round shape, faces the first lateral surface, and is formed within the movement space.

3. The apparatus of claim 2, wherein the rotating bracket member further includes lead-in recesses disposed on the second lateral surface.

4. The apparatus of claim 3, wherein a plurality of lead-in recesses corresponds to the plurality of weight bodies.

5. The apparatus of claim 3, wherein the weight bodies are connected to the elastic body, and are conductive circular metal balls.

6. The apparatus of claim 5, wherein the plurality of circular metal balls are radially installed around the substantial rotation center of the rotating bracket member.

7. The apparatus of claim 6, wherein the elastic bodies are elastic springs configured to support the weight bodies to space the weight bodies apart from the second lateral surface of the rotating bracket member when the wheel of the vehicle does not rotate.

8. The apparatus of claim 7, wherein the elastic springs have an elastic force to cause the weight bodies to contact the second lateral surface of the rotating bracket member at a predetermined rotation speed of the wheel of the vehicle or greater.

9. The apparatus of claim 8, further comprising:
   a plurality of magnetic members disposed on the first lateral surface of the rotating bracket member and configured to fix the weight bodies to the second lateral surface.

10. The apparatus of claim 9, wherein at least two magnetic members of the plurality of magnetic members are installed along a circumference of the first lateral surface of the rotating bracket member.

* * * * *